May 17, 1960 L. W. PARKER 2,937,232

INTERCARRIER TELEVISION RECEIVER

Filed March 11, 1953

INVENTOR.
LOUIS W. PARKER.
BY Ward, Crosby & Neal
ATTORNEYS.

United States Patent Office 2,937,232

Patented May 17, 1960

2,937,232

INTERCARRIER TELEVISION RECEIVER

Louis W. Parker, Great Neck, N.Y.

Application March 11, 1953, Serial No. 341,706

19 Claims. (Cl. 178—5.8)

This invention relates to television receivers of the type using the intercarrier sound system and more particularly to the method and means of obtaining the modulated sound carrier in such receivers.

The principles of intercarrier sound systems are well known in the art, one description of them being given in my U.S. Patent No. 2,448,908.

The term "intercarrier frequency," as will be used in the specification and claims, is intended to designate the beat frequency between picture and sound carriers, which according to present standards is 4.5 megacycles. To simplify explanation, this frequency will be used as the intercarrier frequency in the following description, it being understood that the invention is applicable to any other suitable beat frequency.

Although the invention will be described herein primarily as it may be employed in the superheterodyne type of receiver, the invention may also be used in receivers of the tuned radio frequency type as will be further explained hereinafter.

It will be assumed for purposes of explanation that in the superheterodyne type of receivers, the picture carrier intermediate frequency (or picture I.F. carrier) is 25.75 megacycles and the sound carrier intermediate frequency (or sound I.F. carrier) is 21.25 megacycles, although any other suitable frequencies may be used. It will also be assumed that the picture carrier is amplitude modulated, but because of the invention the sound carrier may be either amplitude or frequency modulated.

Inasmuch as there is a certain amount of amplitude modulation of the sound carrier by the picture or video signals in known types of intercarrier type receivers, it was generally considered that such receivers could be used only when the sound carrier was frequency modulated, and systems for separating the sound and video signals employed an amplitude limiter to remove the unwanted amplitude modulation of the sound I.F. carrier. Thus, the intercarrier type of receiver was considered limited in application.

Investigation has disclosed that the carrier of intercarrier frequency can be made to have a substantially complete freedom from video signal amplitude modulation if two conditions are met. One of these is that the picture I.F. carrier, which, of course, is amplitude modulated, must always have more than two and preferably four or more times the amplitude of the sound I.F. carrier. This must be so even at the time the picture I.F. carrier is momentarily reduced by the modulation to its lowest amplitude. If such condition is achieved, the relationship between the I.F. picture and sound carriers becomes similar to the condition of a modulated carrier and one of its many side bands. It is well known in the art that under this latter condition the beat between one frequency in the side band and the carrier will be of the same amplitude as if no other side band frequencies were present, or in other words, the carrier was not modulated. It is one of the aims of this invention to bring about this condition.

The other condition for keeping the sound carrier free from the amplitude modulation of the picture carrier is the linearity of all the amplifiers and detectors where the two carriers are present simultaneously. This is easily accomplished ahead of the second detector due to the low amplitude of all the signals. Trouble may be experienced, however, in the video frequency amplifier. This may be reduced by conventional means, such as proper bias, higher screen and plate potentials, etc., but if a very high degree of freedom from intermodulation is desired, the picture and sound signals should be separated ahead of the video frequency amplifier.

In the known types of intercarrier receivers the level of the picture carrier may be reduced by uncontrollable or poorly controlled factors below that required to prevent amplitude modulation of the sound carrier for several reasons. The carrier which is amplitude modulated may be reduced periodically by the modulating signal to a low level at the transmitter by overmodulation. The sound and picture carriers are of different frequencies and usually are transmitted from different antennas. Accordingly, the field patterns may be different to such an extent that in some locations the received sound carrier may be several times stronger than the received picture carrier. Also, when the carriers are reflected from moving objects, the ratio between the carriers may go through varying values at the receiver.

It is recommended in my above-mentioned U.S. patent that the amplification of the picture and sound I.F. carriers ahead of the second detector be such that the sound carrier have only about five percent of the picture I.F. carrier amplitude by the time these carriers reach the detector. This ratio of amplitudes works well most of the time, but due to the above-mentioned causes it permits at times various degrees of amplitude modulation of the sound carrier by the picture signals. A further reduction of the sound carrier, for example to 1% of the picture carrier, would almost remedy this situation, but such procedure results in low economy, since this low value of sound signal would have to be amplified high enough in some other place to supply sufficient power to the speaker. In case amplitude modulated sound carrier is used instead of a frequency modulated carrier, the low signal level would also permit spurious noises to become noticeable.

This problem is solved in my present invention by employing circuits in the receiver which provide a 20 to 1 ratio of picture and sound carriers in the conventional manner and by later amplifying the picture carrier still further but permitting little or no further amplification of the sound carrier before applying both carriers to a separate beat producing circuit. This additional amplification of the picture carrier before the beat producing circuit provides a ratio greater than 20 to 1 between the carriers without decreasing the amplitude of the sound carrier and is done without the addition of an amplifier to the conventional intercarrier receiver.

In television reecivers employing separate intermediate frequency amplifiers for the sound and picture signals, it is possible to use the volume of the sound as a tuning indicator because of the selectivity of the sound I.F. amplifier circuits, but with previously known types of intercarrier receivers, the receiver could not be tuned in this manner because relatively large changes in tuning produced only small changes in sound volume.

However, because of the circuits employed in accordance with my invention to obtain the desired ratio between the picture and sound I.F. carriers, it is a simple and inexpensive matter to provide a tuning indication in an intercarrier receiver which is as simple in operation as the tuning indication devices of other types of receivers.

In accordance with the preferred embodiment of my invention, the picture carrier at intermediate frequency after having been amplified in the I.F. amplifier is also amplified in the picture or video signal amplifier along with the video signals at video frequency. The so amplified I.F. picture carrier is combined with the I.F. sound carrier which is at a much lower level or is applied in combination therewith to a circuit which attenuates the I.F. sound carrier with respect to the I.F. picture carrier. The combined carriers are intermodulated in a separate circuit to produce a beat carrier having a frequency equal to the difference in frequency between the sound and picture carriers and modulated by the audio frequency signals. The beat carrier is subsequently demodulated and the resulting audio frequency signals are amplified and supplied to an acoustical system.

Also, in accordance with the preferred embodiment of the invention, the amplifier employed to amplify the audio frequency signals is connected to the beat detector in such a manner that the gain of that amplifier is increased with an increase in amplitude of the picture carrier, due to tuning of the receiver in selecting a station. In this manner, the audible output of the receiver is caused to be loudest when the radio frequency and converter stages of the reecive are correctly tuned to a desired television station.

The principal object of my invention is to overcome the difficulties set forth above in connection with previously known types of intercarrier receivers.

A further object of my invention is to provide an intercarrier receiver suitable for use in television systems employing either an amplitude or a frequency modulated carrier for the transmission of audio frequency signals.

A further object of my invention is to overcome the above-mentioned difficulties and to provide the above-mentioned advantages without increasing the number of amplifier tubes over that employed in previously-known intercarrier receivers.

Other objects and advantages of the invention will be apparent from a consideration of the following detailed description of the invention setting forth the manner in which I now prefer to practice the invention and from a consideration of the accompanying drawing, in which.

Figures 1, 2, 3:
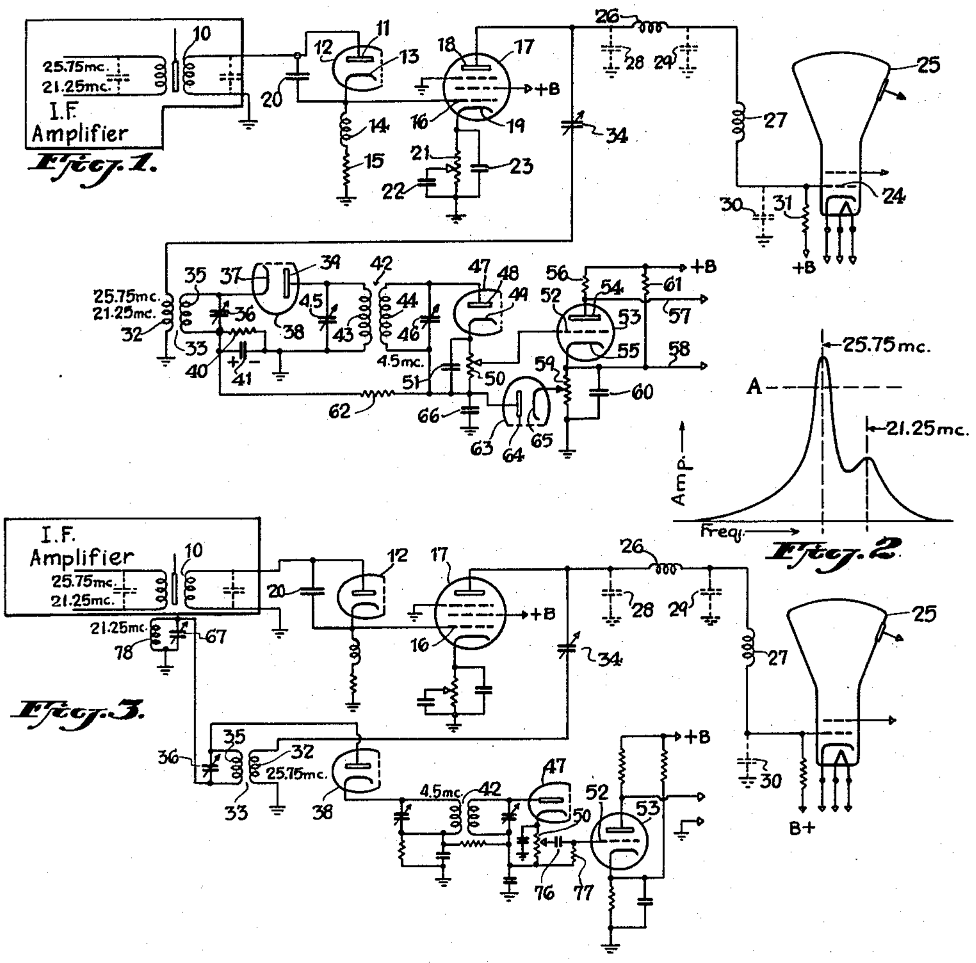
Fig. 1 is a circuit diagram of a simple embodiment of my invention.
Fig. 2 is a selectivity curve used to explain the operation of the circuit shown in Fig. 1.
Fig. 3 is a circuit diagram of a more complex embodiment of the invention.

Referring to Fig. 1, the transformer 10 represents the last intermediate frequency stage of an intercarrier receiver of the type set forth in Patent No. 2,448,908 and the signals at the output of the transformer 10 include two carriers having a substantially fixed frequency difference and modulated respectively by video signals and audio signals. For example, under present-day practice, the picture or video modulated carrier would have a frequency of 25.75 megacycles and the sound or audio modulated carrier would have a frequency of 21.25 megacycles. However, although in accordance with present-day practice the sound I.F. carrier is frequency modulated, it may, in accordance with the present invention, be either frequency or amplitude modulated. Also, as in the receiver set forth in the aforesaid patent, the amplitude of the picture I.F. carrier is, because of the characteristics of the intermediate frequency amplifier, several times the amplitude of the sound I.F. carrier, the ratio preferably being of the order of 20 to 1 when the received carriers have the same amplitude.

One end of the secondary winding of the transformer 10 is connected to the plate 11 of a diode 12 also having a cathode 13. The diode 12 may be in a separate envelope or may form part of a conventional double diode, such as a 6AL5. The diode 12 acts as a detector or a demodulator for the picture I.F. carrier and video frequency signals are obtained at the cathode 13 across the peaking coil 14 and resistor 15.

Due to the inherent capacity between the anode 11 and the cathode 13 of the diode 12, a portion of the picture and sound I.F. carriers also appears across the coil 14 and resistor 15 and, therefore, this portion of these carriers as well as the picture signals are fed to the control electrode or grid 16 of the picture signal or video amplifier tube 17, which also has the usual electrodes including a plate 18 and a cathode 19. Thus, the portion of the carriers fed through the diode 12 as well as the video signals are amplified by the tube 17. If desired, the inherent capacity may be supplemented with a capacitor 20 connected between the plate 11 and the cathode 13.

The video amplifier tube 17 is biased in the conventional manner by means of a resistor 21 and capacitors 22 and 23 connected between the cathode 19 and ground. Capacitor 23 acts as a by-pass capacitor at the frequencies of the picture and sound I.F. carriers and capacitor 22, which is relatively large, varies the degeneration in the video amplifier for video frequency signals.

The video signals are fed from the plate 18 of the tube 17 to the control electrode 24 of a picture tube 25 through a pair of inductances 26 and 27, which together with the inherent capacities designated at 28, 29 and 30 act as a filter coupling circuit to improve the frequency response of the video amplifier. They also prevent the portion of the sound and picture I.F. carriers amplified in the tube 17 from appearing in any undesirable amount at the control electrode 24. Plate energy for the tube 17 is supplied through the resistor 31 connected to a D.C. source (not shown). It is to be understood that the picture tube 25 is supplied with the necessary energizing and operating potentials in the usual manner.

The portions of the sound and picture I.F. carriers which are amplified by the tube 17 are fed to the primary winding 32 of a transformer 33 through a variable capacitor 34. The transformer 33 also has a secondary winding 35 which is tuned by a variable capacitor 36. The variable capacitor 34 and winding 32 are series tuned to the frequency of the I.F. picture carrier, i.e., 25.75 mc., but the characteristics of the transformer 33 which may be adjusted in a well known manner, i.e., by varying the coupling between the windings and the tuning and damping of the windings, are such that a frequency versus amplitude curve of the type shown in Fig. 2 is obtained. Thus, although the transformer 33 in conjunction with the variable capacitor 34 passes both the 25.75 mc. carrier and the 21.25 mc. carrier appearing in the output of tube 17, it attenuates the 21.25 mc. carrier with respect to the 25.75 mc. carrier, the ratio preferably being at least 3 to 1, and it substantially rejects the video frequency signals.

It is to be noted that the circuit comprising the capacitor 34 and the transformer 33 is relatively sharply tuned insofar as the picture I.F. carrier is concerned as distinguished from the tuning of the intermediate frequency amplifier stages of the receiver. In other words, although the response curve of the I.F. stages does not drop below a predetermined level for about 3 mc. on the low side of the picture I.F. carrier frequency, the response curve of the transformer 33 drops off rapidly on both sides of the picture I.F. carrier frequency. Also, the peak at the sound I.F. carrier frequency is considerably lower than the peak at the picture I.F. carrier frequency. Such sharp tuning at this point in the receiver is possible because it is not necessary that the circuit pass the picture I.F. carrier sidebands, and it is desirable that it be sharply tuned for reasons hereinafter set forth.

One end of the secondary winding 35 is connected to the cathode 37 of a diode 38 which has a plate 39. The other end of the secondary winding 35 is connected to resistor 40 and capacitor 41 which are connected to ground. The diode 38 is a mixer used solely to create the intercarrier frequency by intermodulating the picture I.F. carrier with the sound I.F. carrier. Transformer 42 is tuned to the intercarrier frequency and its primary winding 43 is connected between the plate 39 and ground. The secondary winding 44 as well as the primary winding 43 are shunted by variable capacitors 45 and 46 used to tune the transformer 42, although it is to be understood that other types of tuning may be employed. A beat frequency carrier which is modulated by the sound signals is developed across the secondary winding 44 and this winding 44 is connected to a beat detector or demodulator in the form of a diode 47 having a plate 48 and a cathode 49. Audio frequency signals are obtained across a resistor 50 and a capacitor 51 connected in series between the cathode 49 and ground through high capacity condenser 66 and these sound signals are fed to the control electrode 52 of an audio frequency amplifier tube 53 having a plate 54 and a cathode 55. The plate 54 is connected to a direct current source through the plate load resistor 56 and the audio frequency signals are conveyed to a speaker or to further audio frequency amplifiers over leads 57 and 58.

The characteristics of the tube 53 or of the circuits associated therewith may be selected so that the amplifier has a gain which varies with the D.C. bias of the tube 53. In accordance with a further feature of the invention, the bias on the tube 53 is varied with the amplitude of the carriers heterodyned in the circuit including the tube 38 and it is biased so that when no carrier is received the gain is low. Accordingly, the tube 53 is provided with a fixed bias by conventional cathode biasing means including a resistor 59 and a capacitor 60 and by means of the voltage divider including the resistor 59 and the resistor 61 which is connected to the source of D.C. potential. The values of the resistors 59 and 61 are adjusted so that when no other D.C. voltage is present between the control electrode 52 and the cathode 55 the gain of the tube is low.

The filter network including the resistor 40 and the capacitor 41 in conjunction with the tube 38 produces a D.C. bias across the resistor 40 having the polarity indicated in Fig. 1 when carrier energy is supplied to the transformer 33. Because of the frequency characteristic of the transformer 33, this bias has an amplitude substantially proportional to the picture carrier amplitude although it is necessarily affected somewhat by the sound carrier amplitude. The positive end of the resistor 40 is connected to the control electrode 52 through an isolating impedance 62 in the form of a resistor and through the resistor 50. As the amplitude of the received carrier in the transformer 33 increases, the voltage at the positive end of the resistor 40 becomes more positive and opposes the negative bias applied to the tube 53 by means of the resistors 59 and 61, and hence causes the gain of the tube 53 to increase with increases of carrier in the transformer 33. Since the transformer 33 is tuned so that it has maximum carrier energy therein when the radio frequency and converter section of the receiver is tuned so as to provide the proper picture carrier intermediate frequency, the gain of the tube 53 will be a maximum when the radio frequency section is properly tuned. Accordingly, the volume of the sound may be employed to indicate correct tuning of the radio frequency section of the receiver.

Of course, the voltage fed back from resistor 40 to resistor 50 is filtered free from any frequency above about 10 cycles per second. This filtering is done by condensers 41 and 66 in combination with resistor 62.

Since the amplitude of the carriers in the transformer 33 may be relatively high in locations where the received signal strength is high, a diode 63 having a plate 64 and a cathode 65 is preferably connected between the junction of resistor 50 and a by-pass capacitor 66 and a point on resistor 59 which is at positive potential with respect to ground. The diode 63 limits the positive biasing of the tube 53 by conducting and hence reducing the impedance between the junction of resistor 50 and the capacitor 66 and ground when the positive potential at the junction exceeds the positive potential at said point on resistor 59 by a fraction of a volt. Thus, the positive bias applied to the control electrode 52 may be limited to a desired value by suitably selecting the point to which the cathode 65 is connected, and the adjustment may, for example, be such that picture I.F. carrier at the tube 38 exceeding level A indicated in Fig. 2 will cause the diode 63 to conduct. If the signal strength in the area in which the receiver is employed is never excessive or if other methods of limiting the bias applied to the tube 53 are employed, the diode 63 may be omitted. Also, if it is considered unnecessary to provide an indication of the tuning of the receiver, the resistor 61 and the connections between the resistor 40 and the resistor 50 together with diode 63 and condenser 66 may be omitted. The lower end of resistor 50 will, of course, be connected to ground in this case.

The circuit shown in Fig. 1 employs an AM detector 47. However, by detuning transformer 42, FM detection can also be accomplished. If desired, detector 47 and its associated circuit may be replaced by a conventional FM discriminator.

It will be apparent from the above that by use of the circuits described in Fig. 1 the ratio between the amplitudes of the I.F. picture carrier and the I.F. sound carrier may be increased without the use of amplifier stages other than those already present in an intercarrier receiver. Since the ratio has been increased and since the amplitude of the I.F. picture carrier at the output of the transformer 33 is therefore always substantially greater than twice the amplitude of the I.F. sound carrier at the output of transformer 33 under the conditions previously mentioned, the mixing circuit including the tube 38 produces a sound modulated beat carrier which is unmodulated by the picture signals under substantially all conditions of use. For this reason, the difficulties mentioned heretofore in connection with previous types of intercarrier receivers are substantially eliminated and it is possible to employ the receiver in amplitude modulated sound carrier systems as well as frequency modulated sound carrier systems.

The circuit of Fig. 1 provides audio frequency signals at the input of the audio frequency amplifier which are of substantially the same amplitude as the audio frequency signals at the input of the audio frequency amplifier in heretofore known types of intercarrier receivers. It will be noted that the sound I.F. carrier is amplified in the picture signal or video amplifier tube 17.

It may happen inadvertently that due to tube aging, misadjustment or other reasons, or for reasons for economy, the tube 17 is operated on the non-linear portions of its characteristic curve. Although this non-linear type of operation may not affect the picture signals to any great extent, it can cause intermodulation of the picture and sound carriers so that the video frequency signals become audibly noticeable. For these two reasons, when more nearly complete separation of audio and video signals is desired, the embodiment of Fig. 3 may be substituted for the embodiment shown in Fig. 1.

In Fig. 3 the portions of the circuit which are the same as the portions shown in Fig. 1 have the same reference numerals. The circuit shown in Fig. 3 differs from the circuit shown in Fig. 1 in the arrangement for supplying the sound carrier to the transformer 33. In accordance with this modification, the primary winding of the transformer 33 is connected in series with the variable capacitor 34 and is tuned to the frequency of the picture I.F. carrier, i.e., 25.75 mc., so that substantially only the picture I.F. carrier appears in the primary winding 32. The sound I.F. carrier is obtained from a coil 78 coupled to the I.F. transformer 10 and tuned to the sound carrier intermediate frequency, i.e., 21.25 mc., by the capacitor 67. The coil 78 is connected in series with the secondary winding 35, the tuning capacitor 36 and the diode 38, and the picture and sound I.F. carriers are intermodulated in the circuit including tube 38.

The ratio of the picture I.F. carrier to the sound I.F. carrier in the transformer 10 preferably is at least twenty-to-one, and the circuit including the coil 78 and the capacitor 67 is sharply tuned so that it extracts energy from the transformer 10 substantially only at the sound carrier intermediate frequency. By adjusting the coupling between the transformer 10 and the coil 78 and the characteristics of the circuit, the amplitude of the sound I.F. carrier supplied to the tube 38 may have any value within a relatively wide range. Furthermore, the circuit reduces the amplitude of the sound I.F. carrier supplied to the input of the tube 17, and because of the characteristics of the video amplifier which selectively amplifies the picture I.F. carrier and the video signals, the sound I.F. carrier reaching the input of the tube 17 receives little amplification. Accordingly, the ratio between the picture I.F. carrier and the sound I.F. carrier is increased by virtue of the amplification of the picture I.F. carrier in the video amplifier so that the ratio of the two carriers at the tube 38 is much greater than 20 to 1, and the increase in ratio is obtained without a substantial decrease in the amplitude of the audio frequency signals at the input of the tube 53. Also, the embodiment of Fig. 3 provides facilities for easy adjustment of the ratio.

The embodiment of Fig. 3 also differs from the embodiment of Fig. 1 in that the operating conditions of the tube 53 and the coupling between this tube and the beat detector tube 47 are changed so that a change in audio frequency amplification and limiting of the bias applied to the tube 53 is obtained without the use of a diode such as the diode 63 shown in Fig. 1. The tube 53 is a tube operable with zero bias as would a Class B amplifier and the operating voltages of the tube are selected so that the tube 53 has a substantial negative bias when no carrier is received. Due to the fact that the D.C. voltage across the resistor 50 will vary with the amplitude of the beat frequency carrier, the grid or control electrode 52 of the tube 53 is coupled to the resistor 50 by means of a capacitor 76 and is connected to the bottom end of resistor 50 by a resistor 77. However, it is to be noted that the control electrode 52 may be connected to the resistor 50 in the manner shown in Fig. 1 if the average amplitude of the beat frequency carrier is relatively constant and, conversely, the electrode 52 of Fig. 1 may be connected as shown in Fig. 3. When picture carrier is received and the tuning of the radio frequency and converter stages of the receiver is varied for the purpose of selecting a station, the bias on the control electrode 52 varies in the manner described above in connection with the circuit of Fig. 1. As the voltage on the control electrode 52 increases in the positive direction, the gain of the audio amplifier increases but when the voltage reaches a level which causes the tube 53 to conduct between the cathode 55 and the control electrode 52, the current flowing in the circuit between the control electrode 52 and the cathode 55 substantially prevents further positive increases due to the amplitude of the carrier applied to the tube 38. For this reason, the gain of the audio amplifier will increase as the amplitude of the carrier applied to the tube 38 increases until a predetermined level, such as the level A indicated in Fig. 2, is reached and at this level the gain of the audio amplifier will no longer increase. Thus, the audio frequency circuit shown in Fig. 3 operates in a manner similar to the audio frequency circuit shown in Fig. 1 without the use of an additional diode, providing of course that the amplitude of the AF signal is not so high as to vary the bias too much.

The functioning of the remainder of the circuit of Fig. 3 is the same as the functioning of the circuit shown in Fig. 1 and, therefore, detailed explanation of the remaining portions of the circuit shown in Fig. 3 is unnecessary.

Figure 4:
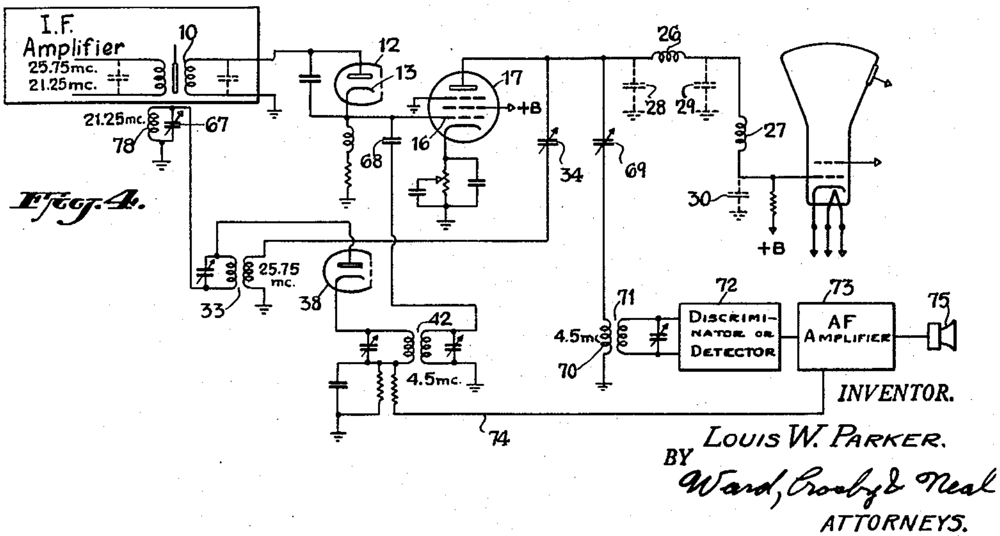
Fig. 4 is a circuit diagram of a further embodiment of the invention capable of supplying higher intercarrier voltage than the embodiments shown in Figs. 1 and 3.

If the amplification obtained by use of the tube 17 is linear and if it is desired to increase the amplitude of the audio signals over the amplitude obtained in the circuit of Fig. 3 without the use of additional amplifier stages, the circuit of Fig. 4 may be employed. In this embodiment the picture signal or video amplifier 17 is used not only to amplify the video signals and the picture I.F. carrier, but also to amplify the sound modulated beat frequency carrier or carrier of intercarrier frequency.

Referring to Fig. 4, the sound and picture I.F. carriers are supplied to the transformer 33 in the manner indicated in connection with Fig. 3. However, the sound modulated beat frequency carrier appearing in the transformer 42 is not directly applied to a detector or a demodulator. Instead, transformer 42 has its secondary winding connected through a capacitor 68 to the control electrode 16 of the tube 17. Thus, the tube 17 operates as a reflex amplifier, the characteristics of the circuits associated with the tube 17 and the gain of the tube 17 being such that the circuit is not excessively regenerative. The tube 17 therefore amplifies the video frequency signals obtained at the cathode 13 of the tube 12, the picture I.F. carrier shunted past the tube 12 and the sound modulated beat frequency carrier obtained from the transformer 42.

The amplified sound modulated beat frequency carrier is taken from the plate circuit of the tube 17 by means of the capacitor 69 and the primary winding 70 of the transformer 71, the capacitor 69 and the winding 70 being series tuned to the beat carrier frequency, i.e., 4.5 mc. The output of transformer 71 is connected to a demodulator indicated schematically at 72 as a detector or discriminator, a discriminator being used when frequency modulated sound is employed for transmitting the sound signals and a detector being used when amplitude modulated sound carrier is employed. The output of the demodulator 72 is connected to the audio frequency amplifier 73 which is connected to a speaker 75 and is connected through lead 74 to the heterodyning circuit for the purpose of obtaining a tuning indication in the manner described in connection with the preceding figures.

It will be apparent that, although I have described my invention in connection with a receiver of the superheterodyne type, my invention is not limited thereto but may be employed with tuned radio frequency receivers. If the invention is used in a tuned radio frequency receiver, transformer 10 would represent the output transformer of the last radio frequency stage, and if the receiver is employed to receive carrier from more than one transmitter, each transmitter operating at a different pair of frequencies, the transformer 32 and its associated condenser 34 and the coil 78 would be tunable to the different transmitter carrier frequencies.

Furthermore, although I have disclosed diode tubes for the purpose of demodulating the various signals, it is apparent that other types of demodulators may be employed. Also, other known types of mixing circuits may be employed to intermodulate the picture and sound carriers and to thereby obtain the carrier of intercarrier frequency.

Reference is made to my copending related applications Serial Nos. 161,279, 307,222, 312,981 and 321,582, filed May 11, 1950, August 30, 1952, October 3, 1952, and November 20, 1952, now Patent Nos. 2,773,119, 2,849,529, 2,826,633, and 2,885,469, granted December 4, 1956, August 26, 1958, March 11, 1958 respectively.

While I have described the invention with reference to the preferred forms thereof, it will be understood by those skilled in the art, after understanding the invention, that modifications and changes may be made therein without departing from the spirit and scope of the invention as defined by the claims appended hereto.

What is claimed as new and what I desire to secure by Letters Patent of the United States is:

1. A television receiver for receiving a pair of modulated carriers having frequencies which differ by a fixed predetermined amount comprising a selecting circuit for said carriers having a frequency characteristic such that said carriers accepted thereby are supplied therefrom in different amplitudes, one supplied carrier having an amplitude greater than the other supplied carrier, a further circuit including means for demodulating said one carrier and for translating portions of both said carriers connected to said selecting circuit, said demodulating means having a circuit in which the modulation signals of said one carrier and said portions of said carriers are developed upon receipt of said carriers and amplifying means for amplifying said modulation signal and said portions of said carriers, said amplifying means having an input circuit and an output circuit and said input circuit being connected to said circuit of said demodulating means, mixing means for intermodulating said carriers, means coupling said mixing means to said output circuit of said amplifying means for supplying both said carriers to said mixing means, and a selective demodulator for demodulating a modulated carrier having a frequency equal to the difference between the frequencies of said pair of carriers connected to said mixing means.

2. A television receiver for receiving a pair of modulated carriers having frequencies which differ by a fixed predetermined amount comprising a selecting circuit for said carriers having a frequency characteristic such that said carriers accepted thereby are supplied therefrom in different amplitudes, one supplied carrier having an amplitude greater than the other supplied carrier, a further circuit including means for demodulating said one carrier and for translating a portion of said one carrier connected to said selecting circuit, said demodulating means having a circuit in which the modulation signals of said one carrier and said portion of said one carrier are developed upon receipt of said one carrier and amplifying means for amplifying said modulation signals and said portion of said one carrier, said amplifying means having an input circuit and an output circuit and said input circuit being connected to said circuit of said demodulating means, mixing means for intermodulating said carriers, means coupling said mixing means to said output circuit of said amplifying means for supplying said one carrier to said mixing means, means connecting said selecting circuit and said mixing means for supplying the other of said carriers to said mixing means, and a selective demodulator for demodulating a modulated carrier having a frequency equal to the difference between the frequencies of said pair of carriers connected to said mixing means.

3. A television receiver for receiving a pair of modulated carriers having frequencies which differ by a fixed predetermined amount comprising a selecting circuit for said carriers having a frequency characteristic such that said carriers accepted thereby are supplied therefrom in different amplitudes, one supplied carrier having an amplitude greater than the other supplied carrier, a further circuit including means for demodulating said one carrier and for translating a portion of said one carrier connected to said selecting circuit, said demodulating means having a circuit in which the modulation signals of said one carrier and said portion of said one carrier are developed upon receipt of said one carrier and amplifying means for amplifying said modulation signals and said portion of said one carrier, mixing means for intermodulating said carriers, means coupling said mixing means to said output circuit of said amplifying means for supplying said one carrier to said mixing means, means connecting said selecting circuit to said mixing means for supplying the other of said carriers to said mixing means, selective coupling means connected between said mixing means and said input circuit of said amplifying means for supplying a modulated beat carrier having a frequency equal to the difference between the frequencies of said pair of carriers to said input circuit of said amplifying means, and a selective demodulator for demodulating said beat carrier connected to said output circuit of said amplifying means.

4. An intercarrier receiver for receiving, amplifying and demodulating carriers having a fixed frequency difference and modulated respectively by video frequency signals and by audio frequency signals comprising a first amplifier for amplifying said carriers in unequal amounts, said video carrier being amplified by said amplifier by a greater amount than said audio carrier, a second amplifier for amplifying said carriers and said video signals and having an input circuit and an output circuit, a first demodulator circuit for demodulating a portion of said video carrier connected between said first amplifier and said input circuit of said second amplifier and being adapted to transfer at least a portion of the energy of both said carriers from said first amplifier to said second amplifier, means for mixing said carriers and for thereby providing an audio signal modulated beat carrier having a frequency equal to said fixed frequency difference, a coupling circuit connected between said output circuit of said second amplifier and said means, said coupling circuit being adapted to attenuate said audio signal carrier with respect to said video signal carrier but to pass portions of both said carriers, a second demodulator circuit for demodulating said audio signal modulated beat carrier connected to said means, and an audio signal amplifier connected to said second demodulator circuit.

5. An intercarrier receiver for receiving, amplifying and demodulating carriers having a fixed frequency difference and modulated respectively by video frequency signals and by audio frequency signals comprising a first amplifier for amplifying said carriers in unequal amounts, said video carrier being amplified by said amplifier by a greater amount than said audio carrier, a second amplifier for amplifying said carriers and said video signals and having an input circuit and an output circuit, a first demodulator circuit for demodulating a portion of said video carrier connected between said first amplifier and said input circuit of said second amplifier and being adapted to transfer at least a portion of the energy of both said carriers from said first amplifier to said second amplifier, means for mixing said carriers and for thereby providing an audio signal modulated beat carrier having a frequency equal to said fixed frequency difference, means coupling said output circuit of said second amplifier to said means for supplying said carriers to said means, a second demodulator circuit for demodulating said audio signal modulated beat carrier connected to said mixing means, and an audio signal amplifier connected to said second demodulator circuit.

6. An intercarrier receiver for receiving, amplifying and demodulating carriers having a fixed frequency difference and modulated respectively by video frequency signals and by audio frequency signals compising a first amplifier for amplifying said carriers in unequal amounts, said video carrier being amplified by said amplifier by a greater amount than said audio carrier, a second amplifier for amplifying said video carrier and said video signals and having an input circuit and an output circuit, a first demodulator circuit for demodulating a portion of said video carrier connected between said first amplifier and said input circuit of said second amplifier and being adapted to transfer at least a portion of the energy of said video carrier from said first amplifier to said second amplifier, means for mixing said carriers and for thereby providing an audio signal modulated beat carrier having a frequency equal to said fixed frequency difference, means coupling said mixing means to said first amplifier and to said output circuit of said second amplifier for supplying said carriers to said mixing means, a second demodulator circuit for demodulating the audio signal modulated beat carrier connected to said mixing means, and an audio signal amplifier connected to said second demodulator.

7. An intercarrier receiver for receiving carriers having a fixed frequency difference and modulated respectively by video frequency signals and by audio frequency signals comprising means for amplifying said carriers in unequal amounts, said video carrier being amplified by a greater amount than said audio carrier; means for separating said audio signals from said video signals and from said carriers connected to said amplifying means, said separating means comprising a first tuned circuit tuned to the frequencies of said carriers but adapted to discriminate against said audio carrier and connected to said amplifying means, a mixing circuit connected to said tuned circuit for providing an audio signal modulated beat carrier having a frequency equal to said frequency difference, said mixing circuit including means for rectifying and at least partially filtering said video carrier and for thereby producing a uni-directional voltage varying in accordance with the average amplitude of said video carrier and a second tuned circuit tuned to the frequency of said beat carrier, and a demodulator circuit for demodulating said beat carrier connected to said second tuned circuit; and a variable gain, audio signal amplifier having an input connected to said demodulator circuit for amplifying the sound signals therein and connected to said rectifying and filtering means for varying the gain of said audio signal amplifier in accordance with the average amplitude of said video carrier.

8. A receiver for a pair of signal modulated carriers comprising means for demodulating one of said carriers and for translating a portion of at least one of said carriers, said demodulating means having a circuit in which the modulation signals of said one carrier and said portion of said one carrier are developed upon receipt of said one carrier, amplifying means for amplifying at least one of said carriers and said modulation signals, said amplifying means having an input circuit and an output circuit and said input circuit being connected to said circuit of said demodulating means, means for intermodulating said carriers and thereby producing a beat carrier modulated by the modulation signals of the other of said carriers, coupling means coupling said intermodulating means to at least said output circuit of said amplifying means for supplying said one carrier to said intermodulating means, and means for demodulating said beat carrier connected to said intermodulating means.

9. A receiver for a pair of signal modulated carriers comprising means for demodulating one of said carriers, amplifying means for amplifying said one carrier and the signals obtained at the output of said demodulating means, said amplifying means having an input circuit and an output circuit and said input circuit being connected to the output of said demodulating means, means for intermodulating said carriers and thereby producing a beat carrier modulated by the modulation signals of the other of said carriers, said intermodulating means having an input for receiving both said carriers, coupling means coupling said input to said output circuit of said amplifying means for supplying said one carrier to said intermodulating means, and means for demodulating said beat carrier connected to said intermodulating means.

10. A receiver for a pair of signal modulated carriers comprising means for demodulating one of said carriers, means for amplifying said one carrier and the signals obtained at the output of said demodulating means connected to the output of said demodulating means, means for intermodulating said carriers and thereby producing a beat carrier modulated by the modulation signals of the other of said carriers and for converting a portion of said one carrier into a voltage whose amplitude varies with the average amplitude of said one carrier, said intermodulating means having an input for receiving said carriers and said input being connected to said amplifying means, means for demodulating said beat carrier connected to said intermodulating and converting means, a variable gain amplifier connected to said means for demodulating said beat carrier for amplifying the signals obtained in the output of said last-mentioned demodulating means, and means connecting said variable gain amplifier to said intermodulating and converting means to control the gain of said variable gain amplifier by said voltage.

11. A television receiver for a pair of signal modulated carriers, one of said carriers being modulated by video frequency signals and the other of said carriers being modulated by audio frequency signals, a common amplifier for said carriers, said amplifier being adapted to amplify the video signal modulated carrier by a greater amount than the audio signal modulated carrier, a demodulator for said video carrier connected to said amplifier, said demodulator being adapted to pass a portion of said video carrier, a video amplifier adapted to amplify video signals and said video carrier, said video amplifier having an input and an output and said input being connected to said demodulator, a picture tube, a coupling network connected between said output of said video amplifier and said tube, said network being adapted to pass said video signals and to reject said video carrier, a mixer for intermodulating said carriers, said mixer having an input for receiving said carriers, a selective coupling circuit adapted to pass said video carrier and to reject said video signals connected between said output of said video amplifier and said mixer input, a beat demodulator adapted to demodulate a carrier having a frequency equal to the difference between the frequencies of said carriers connected to said mixer, and an audio signal amplifier connected to said beat demodulator.

12. A television receiver for a pair of signal modulated carriers, one of said carriers being modulated by video frequency signals and the other of said carriers being modulated by audio frequency signals, a common amplifier for said carriers, said amplifier being adapted to amplify the video signal modulated carrier by a greater amount than the audio signal modulated carrier, a demodulator for said video carrier connected to said amplifier, said demodulator being adapted to pass at least a portion of said video and audio carriers, a video amplifier adapted to amplify video signals and said video and audio carriers, said video amplifier having an input and an output and said input being connected to said demodulator, a picture tube, a coupling network connected between said output of said video amplifier and said tube, said network being adapted to pass said video signals and to reject said video and audio carriers, a mixer for intermodulating said carriers, a selective coupling circuit adapted to pass said video and audio carriers and to reject said video signals connected between said output of said video amplifier and said mixer, said circuit also being adapted to attenuate said audio carrier with respect to said video carrier, a beat demodulator adapted to demodulate a carrier having a frequency equal to the difference between the frequencies of said carriers connected to said mixer, and an audio signal amplifier connected to said beat demodulator.

13. A television receiver for a pair of signal modulated carriers, one of said carriers being modulated by video frequency signals and the other of said carriers being modulated by audio frequency signals, a common amplifier for said carriers, said amplifier being adapted to amplify the video signal modulated carrier by a greater amount than the audio signal modulated carrier, a demodulator for said video carrier connected to said amplifier, said demodulator being adapted to pass a portion of said video carrier, a video amplifier adapted to amplify video signals and said video carrier, said video amplifier having an input and an output and said input being connected to said demodulator, a picture tube, a coupling network connected between said output of said video amplifier and said tube, said network being adapted to pass said video signals and to reject said video carrier, a mixer for intermodulating said carriers, a selective coupling circuit adapted to pass said output of said video carrier and to reject said video signals connected between said video amplifier and said mixer, a selective coupling circuit adapted to pass said audio carrier connected between said common amplifier and said mixer, a beat demodulator adapted to demodulate a carrier having a frequency equal to the difference between the frequencies of said carriers connected to said mixer, and an audio signal amplifier connected to said beat demodulator.

14. A television receiver for a pair of signal modulated carriers, one of said carriers being modulated by video frequency signals and the other of said carriers being modulated by audio frequency signals, a common amplifier for said carriers, said amplifier being adapted to amplify the video signal modulated carrier by a greater amount than the audio signal modulated carrier, a demodulator for said video carrier connected to said amplifier, said demodulator being adapted to pass a portion of said video carrier, a video amplifier adapted to amplify video signals and said video carrier, said video amplifier having an input and an output and said input being connected to said demodulator, a picture tube, a coupling network connected between said output of said video amplifier and said tube, said network being adapted to pass said video signals and to reject said video carrier, a mixer for intermodulating said carriers and for producing a voltage which varies with the average amplitude of said video carrier, said mixer having an input for receiving said carriers, a selective coupling circuit adapted to pass said video carrier and to reject said video signals connected between said output of said video amplifier and said mixer input, a beat demodulator adapted to demodulate a carrier having a frequency equal to the difference between the frequencies of said carriers and connected to said mixer, an audio signal amplifier connected to said beat demodulator, said audio amplifier having a voltage responsive gain control, means coupling said gain control to said mixer for controlling the gain of said audio amplifier in accordance with the average amplitude of said video carrier, and means limiting the voltage applied to said gain control.

15. A television receiver for a pair of modulated carriers having frequencies which differ by a fixed predetermined amount comprising a selecting circuit for said carriers and having an output; a further circuit including means for demodulating one of said carriers and for transferring a portion of said one carrier, said demodulating means including a circuit in which the modulation signals of said one carrier and said portion of said one carrier are developed upon receipt of said one carrier and said further circuit including amplifying means for amplifying said modulation signals and said portion of said one carrier, said amplifying means having an input circuit and an output circuit and said input circuit beng connected to said circuit of said demodulating means, and means connecting said demodulating means to said output of said selecting circuit; one of said selecting and said further circuits also transferring at least a portion of the other of said carriers; mixing means for intermodulating said carriers, said mixing means having an input and an output; means coupling said input of said mixing means to said output of said selecting circuit for supplying said carriers to said mixing means, said coupling means including means coupling said input of said mixing means to said output circuit of said amplifying means for supplying at least said one carrier to said mixing means; and a selective demodulator for demodulating a modulated carrier having a frequency equal to the difference between the frequencies of said pair of carriers, said selective demodulator having an input connected to said output of said mixing means.

16. A television receiver for receiving a pair of modulated carriers having frequencies which differ by a fixed predetermined amount comprising a selecting circuit for said carriers, said selecting circuit having an output and having a frequency characteristic such that, upon receipt of said carriers, one said carrier has an amplitude greater than the amplitude of the other said carrier in said output; a further circuit including means for demodulating said one carrier and for transferring a portion of said one carrier, said demodulating means including a circuit in which the modulation signals of said one carrier and said portion of said one carrier are developed upon receipt of said one carrier and said further circuit including amplifying means for amplifying said modulation signals and said portion of said one carrier, said amplifying means having an input circuit and an output circuit and said input circuit being connected to said circuit of said demodulating means, and means connecting said demodulating means to said output of said selecting circuit; one of said selecting and said further circuits also transferring at least a portion of said other carrier; mixing means for intermodulating said carriers, said mixing means having an input and an output; means coupling said input of said mixing means to said output of said selecting circuit for supplying said carriers to said mixing means, said coupling mean including means coupling said input of said mixing means to said output circuit of said amplifying means for supplying at least said one carrier to said mixing means; and a selective demodulator for demodulating a modulated carrier having a frequency equal to the difference between the frequencies of said pair of carriers, said selective demodulator having an input connected to said output of said mixing means.

17. A television receiver for receiving a pair of amplitude modulated carriers having frequencies which differ by a fixed predetermined amount comprising a selecting circuit for said carriers, said selecting circuit having an output and having a frequency characteristic such that, upon receipt of said carriers, one said carrier has an amplitude greater than the amplitude of the other said carrier in said output; a further circuit including means for demodulating said one carrier and for transferring a portion of said one carrier, said demodulating means including a circuit in which the modulation signals of said one carrier and said portion of said one carrier are developed upon receipt of said one carrier and said further circuit including amplifying means for amplifying said modulation signals and said portion of said one carrier, said amplifying means having an input circuit and an output circuit and said input circuit being connected to said circuit of said demodulating means, and means connecting said demodulating means to said output of said selecting circuit; one of said selecting and said further circuits also transferring at least a portion of said other carrier; mixing means for intermodulating said carriers, said mixing means having an input and an ouptut; means coupling said input of said mixing means to said output of said selecting circuit for supplying said carriers to said mixing means, said coupling means including means coupling said input of said mixing means to said output circuit of said amplifying means for supplying at least said one carrier to said mixing means; and a selective demodulator for demodulating a modulated carrier having a frequency equal to the difference between the frequencies of said pair of carriers, said selective demodulator having an input connected to said output of said mixing means.

18. A television receiver for receiving an amplitude modulated carrier and a frequency modulated carrier, said carriers having frequencies which differ by a fixed predetermined amount, said receiver comprising a selecting circuit for said carriers, said selecting circuit having an output and having a frequency characteristic such that, upon receipt of said carriers, said amplitude modulated carrier has an amplitude greater than the amplitude of said frequency modulated carrier in said output; a further circuit including means for demodulating said amplitude modulated carrier and for transferring a portion of said amplitude modulated carrier, said demodulating means including a circuit in which the modulation signals of said amplitude modulated carrier and said portion of said amplitude modulated carrier are developed upon receipt of said amplitude modulated carrier and said further circuit including amplifying means for amplifying said modulation signals and said portion of said amplitude modulated carrier, said amplifying means having an input circuit and an output circuit and said input circuit being connected to said circuit of said demodulating means, and means connecting said demodulating means to said output of said selecting circuit; one of said selecting and said further circuits also transferring at least a portion of said frequency modulated carrier; mixing means for intermodulating said carriers, said mixing means having an input and an output; means coupling said input of said mixing means to said output of said selecting circuit for supplying said carriers to said mixing means, said coupling means including means coupling said input of said mixing means to said output circuit of said amplifying means for supplying at least said amplitude modulated carrier to said mixing means; and a selective demodulator for demodulating a frequency modulated carrier having a frequency equal to the difference between the frequencies of said pair of carriers, said selective demodulator having an input connected to said output of said mixing means.

19. A television receiver for receiving a pair of modulated carriers having frequencies which differ by a fixed predetermined amount comprising a selecting circuit for said carriers, said selecting circuit having an output and having a frequency characteristic such that upon receipt of said carriers, one said carrier has an amplitude greater than the amplitude of the other said carrier in said output; a further circuit including means for demodulating said one carrier and for transferring a portion of said one carrier, said demodulating means including a circuit in which the modulation signals of said one carrier and said portion of said one carrier are developed upon receipt of said one carrier and said further circuit including amplifying means for amplifying said modulation signals and said portion of said one carrier, said amplifying means having an input circuit and an output circuit and said input circuit being connected to said circuit of said demodulating means, and means connecting said demodulating means to said output of said selecting circuit; one of said selecting and said further circuits also transferring at least a portion of said other carrier; mixing means for intermodulating said carriers and including means for converting said portion of said one carrier into a voltage whose amplitude varies with the average amplitude of said one carrier, said mixing means having an input and an output; means coupling said input of said mixing means to said output of said selecting circuit for supplying said carriers to said mixing means, said coupling means including means coupling said input of said mixing means to said output circuit of said amplifying means for supplying at least said one carrier to said mixing means; a selective demodulator for demodulating a modulated carrier having a frequency equal to the difference between the frequencies of said pair of carriers, said selective demodulator having an input connected to said output of said mixing means and having an output; a variable gain amplifier having an input and having gain controlling means, means connecting said input of said variable gain amplifier to said output of said selective demodulator for amplifying the modulation signals of said last-mentioned modulated carrier; and means connecting said gain controlling means of said variable gain amplifier to said converting means, whereby the gain thereof is varied by said voltage.

References Cited in the file of this patent

UNITED STATES PATENTS

| | | |
|---|---|---|
| 2,448,908 | Parker | Sept. 7, 1948 |
| 2,505,843 | Smith | May 2, 1950 |
| 2,528,222 | Foster | Oct. 31, 1950 |
| 2,629,769 | Stroh | Feb. 24, 1953 |
| 2,642,491 | Cotsworth | June 16, 1953 |
| 2,790,848 | Koch | Apr. 30, 1957 |

UNITED STATES PATENT OFFICE

CERTIFICATE OF CORRECTION

Patent No. 2,937,232 May 17, 1960

Louis W. Parker

It is hereby certified that error appears in the printed specification of the above numbered patent requiring correction and that the said Letters Patent should read as corrected below.

Column 13, line 3, strike out "output of said" and insert the same after "between said" in line 4, same column 13.

Signed and sealed this 25th day of October 1960.

(SEAL)
Attest:

KARL H. AXLINE
Attesting Officer

ROBERT C. WATSON
Commissioner of Patents